July 7, 1959
H. W. YERIAN
2,893,788
MASTER PIN FOR AN ENDLESS TRACK
Filed Feb. 20, 1956
2 Sheets-Sheet 1
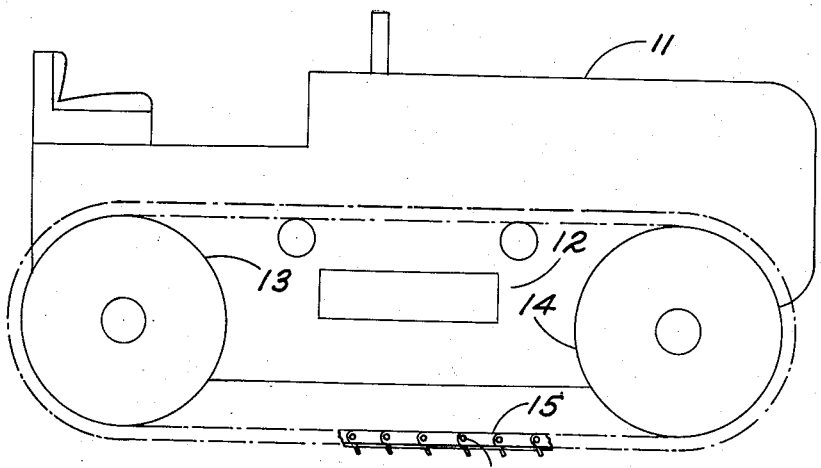
Fig. 1
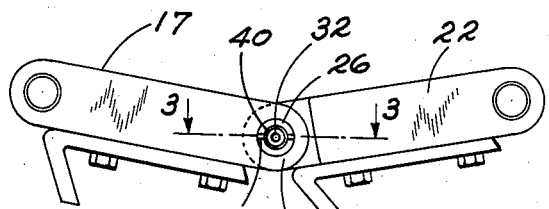
Fig. 2
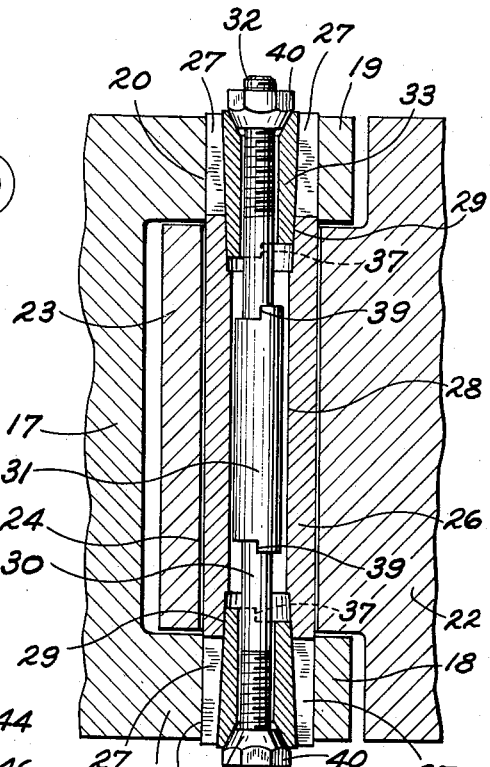
Fig. 3
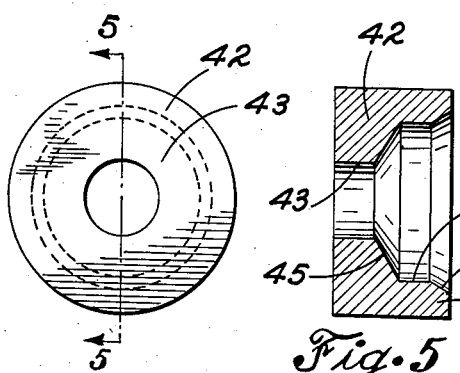
Fig. 4
Fig. 5
INVENTOR.
HAROLD W. YERIAN.
BY
RICHEY, WATTS, EDGERTON & McNENNY
ATTORNEYS July 7, 1959
H. W. YERIAN
2,893,788
MASTER PIN FOR AN ENDLESS TRACK
Filed Feb. 20, 1956
2 Sheets-Sheet 2
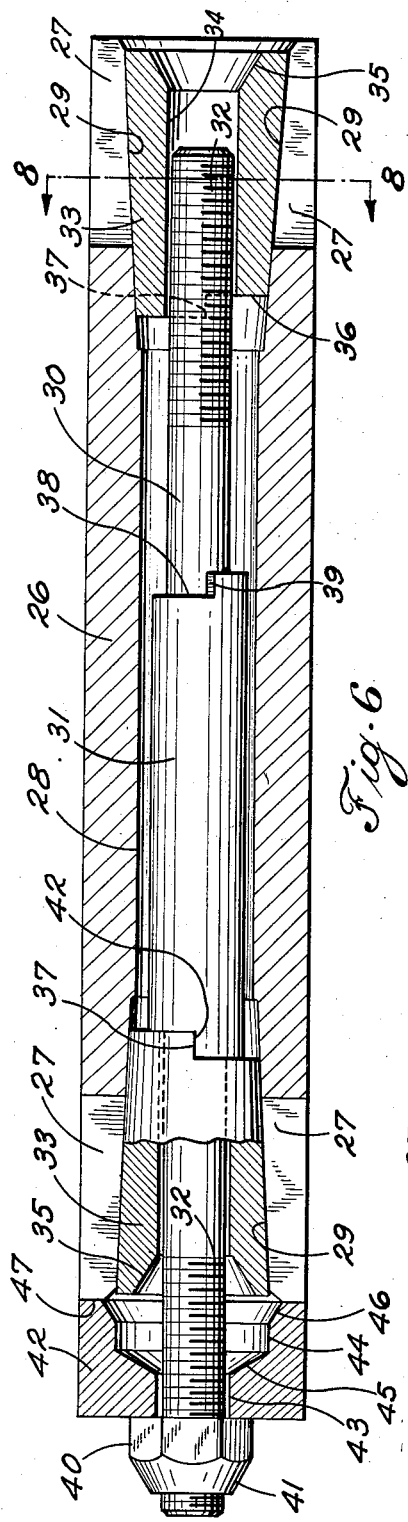
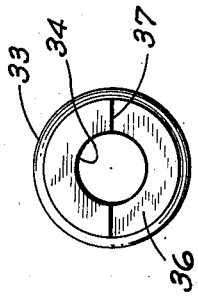
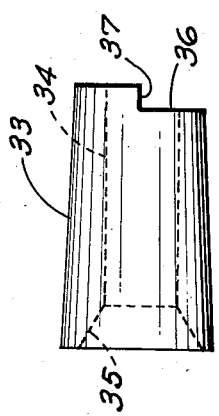
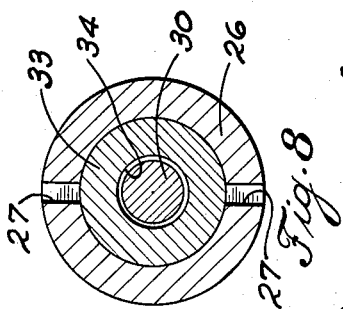
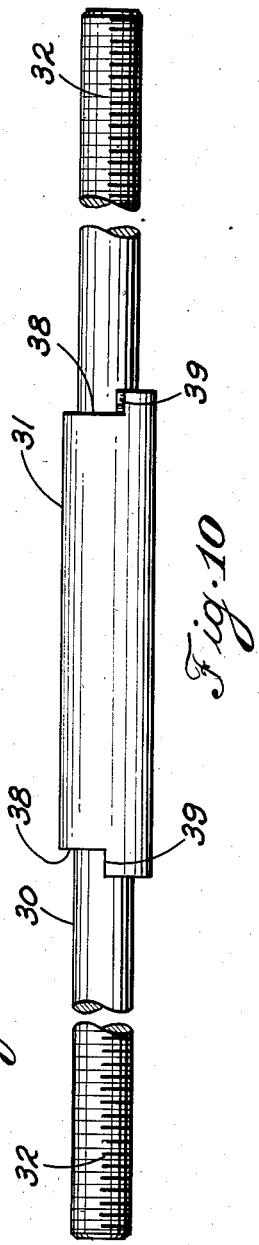
INVENTOR.
HAROLD W. YERIAN.
BY
RICHEY, WATTS, EDGERTON & McNENNY
ATTORNEYS United States Patent Office 2,893,788
Patented July 7, 1959

2,893,788
MASTER PIN FOR AN ENDLESS TRACK
Harold Willian Yerian, Cumberland, Ohio
Application February 20, 1956, Serial No. 566,417
5 Claims. (Cl. 305—10)

This invention relates to master pins for joining track chains on crawler tractors.

Track chains are made up of a series of joining links with one of each pair of joining links being offset outwardly and the adjoining pair of links being offset inwardly. Pins joining each link are more or less permanently established and allow one link to flex at the pin in relation to the other. It is necessary, however, to provide a pin which may be designated as a master pin to allow for the joining or separation of the entire track. Such a master pin must be capable of being removed quickly and easily, without the use of special tools or equipment, to permit removal, repair and replacement of tracks in the field and, at the same time, must be capable of being secured in place tightly and permanently so as not to become loosened or displaced under the loads, vibrations and severe conditions to which such tracks are subjected in use.

My invention relates to a master pin which solves this problem; which can be tightly and permanently secured and locked in position so as to remain in place during the operation of the track under all the various conditions and loads to which such tracks are subjected; and which can be quickly and easily removed merely by the use of an ordinary wrench and a small, simple puller which can be readily carried in the tool box of the vehicle.

The master pin of this invention includes a hollow pin having expansible ends adapted to be expanded and locked in aligned holes of spaced ears formed on an end of one link, and a central portion to extend through and bear within a hole in a knuckle formed on an end of an adjacent link, so that the two links are pivotally connected together. Hollow wedging members having conical exterior surfaces are arranged to be forced into the expansible ends of the pin to expand the same into tight gripping engagement, the angle of taper of the conical surfaces being small so that the wedges are self-locking. A tension member extends through the hollow interior of the pin and through the holes in the wedges and is provided with threaded ends to receive nuts which can be drawn up to drive the wedges in place and hold the entire assembly in fixed position. The nuts are preferably fitted in conical openings in the ends of the wedges so that the nuts are gripped and locked against accidental unscrewing.

To permit removal of the pin, the tension member includes abutment surfaces normally spaced inwardly from the inner ends of the wedges. The inner ends of the wedges are provided with mating abutments so that the tension member, with the nuts removed, can be moved axially to bring the abutment into engagement and prevent relative rotation between the tension member and the wedge with which it is in engagement. A puller is arranged to be slipped over the projecting threaded end of the tension member in this position and a nut applied to the projecting threaded end can then be tightened up to pull the wedge axially out of the hollow pin. This operation is repeated at the other end to remove the other wedge. With the wedges removed the ends of the pin contract in the openings in the link in which they are secured, and the pin can be slipped out to uncouple the links.

Other objects and advantages of my invention will be apparent in the following description and from the drawings of which:

Fig. 1 is a diagrammatic side elevation view of a crawler tractor having a track chain;

Fig. 2 is a side elevation of two links of a track pivoted together with an embodiment of this invention;

Fig. 3 is a longitudinal sectional view of the master pin taken at 3—3 of Fig. 2;

Fig. 4 is an end view of a puller device;

Fig. 5 is a cross-sectional view of the puller taken at 5—5 of Fig. 4;

Fig. 6 is an enlarged longitudinal section of the master pin and puller;

Fig. 7 is an enlarged side view of a cone for the master pin;

Fig. 8 is a cross-section on the line 8—8 of Fig. 6;

Fig. 9 is an end view of the cone of Fig. 7; and

Fig. 10 is a side elevation of the tension member of the master pin.

In Fig. 1 there is shown a crawler tractor 11 having a track frame 12 which rotatably supports a rear driving sprocket 13 and a front idler sprocket 14 for an endless track 15, which consists of metal links of any suitable construction pivoted together at their ends to form a traction chain. A master pin structure 16 by which two links of the track are pivotally connected is shown in detail in Fig. 3. Track link 17 is formed with a pair of spaced ears 18 and 19 formed with aligned bores 20 and 21. Track link 22 is formed with a knuckle 23 fitting between the ears 18 and 19 and formed with a bore 24 axially aligned with the bores 20 and 21. A hollow steel pin 26 extends through the aligned bores 20, 21 and 24 and is arranged to be removably secured to one link and journalled in the other so as to pivotally connect the two links 17 and 22.

In the illustrated embodiment the pin 26 is formed with two slots 27 extending axially inwardly from each free end of the pin through about the depth of the ears 18 and 19 so as to make the end portions of the pin 26 which are received in the bores 20 and 21 resiliently expansible.

In the illustrated embodiment the bores 20 and 21 are slightly smaller in diameter than the bore 24 so as to provide a good journal bearing between the central portion of the pin and the knuckle 23, and a snug fit between the slotted end portions in their unexpanded condition and the ears 18 and 19. However, the relative diameters of the bearing portions and the locking portions of the pin 26 may be varied as necessary to cooperate correctly with the openings in the particular track links with which the pin is to be used.

The pin 26 is provided with an axial bore 28 and at each end with a frusto-conical counterbore 29 which, as illustrated, may extend slightly farther into the pin from the end thereof than the axial slots 27. A bolt or tension member 30 having an enlarged central portion 31 fits freely within the bore 28 of the pin 26 and is slightly longer in total length than the pin 26. Each of the free ends of the bolt 30 is provided with screw threads as indicated at 32.

Hollow wedging cones 33, shown in Figs. 7 and 9 fit over the threaded ends of the bolt 30 and are formed with frusto-conical external surfaces to fit in the frusto-conical counterbores 29 to expand the slotted ends of the pin 26. Each cone 33 is provided with a substantially cylindrical bore 34, and at its larger diameter end with a conical counterbore 35. At its smaller diameter end each cone is cut away through about half of its circumference as indicated at 36, leaving axially extending abutment faces 37. The enlarged central portion 31 of the bolt 30 is also cut away at each end as indicated at 38, leaving axially extending abutment surfaces 39 adapted to mesh with the abutment surfaces 37 on the inner ends of the cones. These mating abutment surfaces operate when the master pin is to be removed to uncouple the track links and in the assembled position of the parts as shown in Fig. 3 the abutments 39 on the central portion of the bolt 30 are spaced inwardly from the abutments 37 on the ends of the cones 33. Nuts 40 are arranged to be threaded on the threaded ends 32 of the bolt 30. The nuts 40 are formed with conical projections 41 to fit within the conical counterbores 35 of the wedging cones 33.

To couple the links 17 and 22 with the master pin, the knuckle 23 is positioned between the ears 18 and 19 and the hollow pin 26 is pushed into the aligned bores 20, 21 and 24. The bolt 30 is inserted into and centered in the hollow pin 26. The wedging cones 33 are then slipped over the threaded ends 32 of the bolt and pressed into firm engagement with the conical counterbores 29 in the pin 26. The nuts 40 are then threaded on the threaded ends 32 of the bolts with their conical projections 41 fitting in the conical counterbores 35 of the wedging cones 33. The nuts are then tightened to further drive the wedging cones 33 into the conical counterbores 29 until the slotted ends of the pin 26 have been expanded into secure locking engagement with the ears 18 and 19, so that the pin 26 is locked in position in the ears 18 and 19 and in the knuckle 23 and the track links 17 and 22 are thereby securely coupled together.

The angle of taper of the frusto-conical counterbores 29 and the mating conical external surfaces of the wedging cones 33 is small so that the cones are self-locking when wedged into position. As illustrated, this may be an angle of about 3° when both the cones 33 and the pin 26 are made of steel and the length of the surfaces in wedging engagement is equal to at least the maximum diameter of the cones. With other materials or proportions a suitable angle may be selected to insure locking of the cones in position when the ends of the pins 26 have been expanded into locking engagement with the cooperating track link. Thus even if the nuts 40 should become loosened or displaced during normal use of the track the cones 33 remain locked in position so that the pin 26 remains solidly held in assembled position. At the same time, the conical ends 41 of the nuts 40 wedge within the conical counterbores 35 of the cones 33 to provide a firm frictional engagement between the nuts 40 and the counterbores 35 to resist loosening of the nuts 40.

To remove the master pin 26 when it is desired to uncouple the track links 17 and 22, the nuts 40 are first removed with suitable wrenches. If one of the nuts remains tight on its threads after initial loosening of the other the latter is first removed and then the bolt 30 is moved axially toward the nut which is not free and adjusted to bring the abutment surfaces 39 into engagement with the abutment surfaces 37 of the adjacent wedging cone 33. The remaining nut may then be readily removed with a wrench.

After both nuts have been removed, the abutment surfaces 39 on one end of the central enlargement 31 of the bolt 30 are moved or maintained in meshing engagement with the abutment surfaces 37 of one of the cones 33. A puller member 42 is then slipped over the projecting threaded end 32 of the bolt 30. The puller member includes a bore 43 of a size to fit loosely around the threaded end 32 of the bolt, and a counterbore 44 of sufficient diameter to receive the larger diameter ends of the cones 33. The bore 43 and the counterbore 44 may be conveniently joined by a tapered bore 45, and the bore 44 may terminate in another tapered bore 46 to facilitate proper centering and alignment of the puller member 42 with the wedging cones 33. Surrounding the bores 44 and 46 the puller consists of a circular flange having an annular end face 47 with its external diameter substantially equal to, or smaller than, the external diameter of the pin 26, and with its internal diameter large enough to receive the large end of the cone 33.

Thus, as shown at the left-hand end of Fig. 6, the surface 47 of the puller member abuts against an end of the pin 26 with the adjacent threaded end 32 of the bolt projecting through its central bore 43. One of the nuts 40 may then be inverted from its normal position and screwed on the projecting threaded end 32 so that the flat face of the nut abuts the face of the puller around its bore 43. So long as the adjacent wedging cone 33 is locked in its counterbore 29, the abutment surfaces 37 and 39 prevent rotation of the bolt 30 with respect to the pin 26 so that tightening of the nut 40 pulls the wedging cone 33 axially out of its counterbore 29. As soon as the cone 33 has been moved far enough so that it no longer prevents rotation of the bolt 30 it is also free enough to be pulled by hand out of the counterbore 29.

After one of the wedging cones 33 has been removed in this manner the puller member 42 is removed, the bolt 30 is pushed back through the pin 26 to bring the other end of the central enlargement 31 into engagement with the wedging cone 33 at the other end of the pin, the puller is assembled over the other end of the bolt which is then projecting out of its wedging cone, and the second wedging cone is removed in the same way as the first. As soon as both of the wedging cones have been removed the entire pin 26 can readily be slipped out of the bores 20, 21 and 24 in the ends of the track links 17 and 22 so as to uncouple the links.

The total length of the bolt 30 is only slightly greater than the over-all width of the link 17 so that, as shown in Fig. 3, the ends of the bolt do not project substantially beyond the link and thus do not interfere with the normal operation of the track. In the preferred embodiment, the conical portions 41 of the nuts 40 fitting within the conical counterbores 35 in cones 33 serve not only to provide a frictional lock for the nuts to resist unscrewing, but also permit the nuts to be positioned at least partially within the ends of the pin 26 so as to reduce the necessary projecting length of the ends 32 of the bolt to avoid interference with the normal operation of the track. In the locked position, as shown in Fig. 3, the stepped ends of the central enlargement 31 of the bolt 30 are spaced inwardly from the mating ends of the cones 33 a distance at least equal to the axial length of the puller 42 and the nut 40 so as to permit the bolt 30 to be moved axially toward either one of the wedging cones 33 a sufficient distance to project the threaded end 32 of the bolt out of the pin 26 far enough to receive the puller 42 and nut 40 in the manner illustrated on the left-hand side of Fig. 6 when the master pin is to be removed.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

What is claimed is:

1. A master pin for joining links including a hollow pin extending transversely through said links and having a slotted expansible portion adapted to fit within a hole in a link member, said slotted portion having a frusto-conical interior surface, a hollow wedging member having a frusto-conical exterior surface fitting within the interior surface of said slotted portion, said frusto-conical surface tapering at a small angle to the axis of said pin, a bolt adapted to be positioned within said pin with a threaded end projecting through said hollow wedging member, a nut on said threaded end, said nut and said hollow wedging member having cooperating bearing surfaces arranged at a greater angle to the axis of said pin than said frusto-conical surfaces and means securing the other end of said bolt within the other end of said pin, whereby tightening said nut on said threaded end is effective to drive said wedging member into said slotted portion of said pin and exert an expanding force on said slotted portion exceeding the force applied to said bearing surfaces of said nut and wedging member.

2. A master pin structure for connecting and disconnecting an endless track having a pair of end links at each end of said track, one pair of end links being spaced inwardly of said other pair of end links, and said links each provided with an aperture, said apertures being in alignment for connection, the combination including, a cylindrical member having a bore therethrough, said bore being conically shaped at each end of said cylinder, a pair of slots transverse of the axis of said cylindrical member and running longitudinally of the member a spaced distance from each end thereof, said cylindrical member joining said pairs of end links by passing through the apertures therein, a cone means at each end of said cylindrical member for engaging with said tapered bore for expanding each end of said cylindrical member radially outwardly from said slots, a tension member having a central portion of greater diameter than said tension member, said tension member having a threaded portion at each end thereof, a nut threadably engaging one end of said tension member, a puller means adapted to engage an end of said cylindrical member and having a bore therethrough to receive said threaded portion of said tension member, whereby tightening said nut on said tension member toward the puller moves the tension member outwardly of the cylindrical member until said central portion engages said tapered cone in locked relationship, and further tightening of the nut causes said tension member and central portion to disengage the cone from said cylindrical member.

3. A master pin structure for joining an endless track for a crawler tractor, said endless track comprising a plurality of pivotally joined links, one of said joined links being joined by a master pin comprising in combination, a cylindrical member having a bore longitudinally therethrough, said bore being tapered outwardly at each end, a pair of slots cut through each end of said cylindrical member, said cylindrical member joining said endless track by passing through apertures provided in a pair of links of said track, a pair of cone means each having a longitudinal bore therethrough, each cone means forcefully engaging said cylindrical member at the tapered bores to expand said ends of said cylindrical member in the endless track for joining thereof, a tension member having an enlarged central portion located within the bore of said cylindrical member with the ends of said tension member extending outwardly through the bores of said pair of cone means, fastener means engaging each end of said tension member to secure said tension member to said cone means.

4. The combination of claim 3 wherein said fastener means are disengaged, a puller means having a bore therethrough located at one end of said tension member, one of said fastener means engaging said tension member outwardly of said puller means, said fastener means being drawn up to said puller to move said central portion of said tension member into locking engagement with one of said cone means, whereby further drawing up of said fastener means on the locked tension member drives said cone means outwardly to release it from said cylindrical member.

5. A master pin for joining links including a hollow pin extending transversely through said links and having a slotted expansible portion with a substantially cylindrical exterior surface adapted to fit within a hole in a link member, said slotted portion having a frust-conical interior surface, a hollow wedging member having a frusto-conical exterior surface fitting within the interior surface of said slotted portion, said frusto-conical surfaces tapering at a small angle to the axis of said pin, whereby said wedging member is self-locking when driven into said slotted portion, a bolt adapted to be positioned within said pin with a threaded end projecting through said hollow wedging member, a nut on said threaded end adapted to engage one end of said wedging member to wedge the same into said slotted portion, and an abutment on said bolt to engage the other end of said wedging member to pull the same out of said pin.

References Cited in the file of this patent
UNITED STATES PATENTS

| | | |
|---|---|---|
| 1,924,161 | Knox | Aug. 29, 1933 |
| 2,517,429 | Henning | Aug. 1, 1950 |
| 2,621,981 | Scheck | Dec. 16, 1952 |
| 2,664,620 | Beasley | Jan. 5, 1954 |